United States Patent Office 3,563,942
Patented Feb. 16, 1971

3,563,942
AQUEOUS DISPERSION OF COPOLYESTERS MODIFIED WITH A SULFONATED AROMATIC COMPOUND
Philip Heiberger, Broomall, Pa., assignor to E. I. du Pont de Nemours and Company, Wilmington, Del., a corporation of Delaware
No Drawing. Filed Nov. 29, 1967, Ser. No. 686,712
Int. Cl. C08g 51/24; C08j 1/46; C09d 5/02
U.S. Cl. 260—29.2
11 Claims

ABSTRACT OF THE DISCLOSURE

New solvent-soluble linear copolyester compositions which can be dispersed in aqueous mediums. Water dispersibility is gained by the addition to the copolyesters of about 1–2% (molar) of the metal salt of a sulfonated aromatic compound such as sodium dimethyl-5-sulfoisophthalate. These copolyesters have improved adhesion and are useful as coating compositions particularly where it is desirable to avoid the toxic, polutant, and corrosive effects which are present with most organic solvent-borne polyesters.

BACKGROUND OF THE INVENTION

This invention relates broadly to linear polyesters and more particularly to modified solvent-soluble linear copolyesters which are capable of being dispersed in an aqueous medium.

Copolyesters are well known in the prior art because of their unique combination of excellent chemical and physical properties. Unfortunately, it has previously been the practice to dissolve these copolyesters in solvents such as chlorinated hydrocarbons to obtain a carrier with practical concentrations of polyester present. Typically, these solvents are characterized by the undesirable properties of high toxicity and high corrosiveness. Often, these solvents are discharged into the atmosphere or into rivers, streams, ponds, etc., after the copolyester is spent and thus they can present a highly undesirable pollution problem.

Griffing et al., U.S. Pat. 3,018,272, issued Jan. 23, 1962, has disclosed the modification of film and/or fiber forming linear polyesters with minor amounts of the metallic salt of a sulfonated compound. Such modification results in these superpolyesters having an improved affinity for basic type dyes. Griffing does not disclose or suggest, however, that low molecular weight solvent-soluble linear copolyesters useful for forming coating compositions can be modified with the sulfonate compounds to improve their water dispersibility and their adhesion.

SUMMARY OF THE INVENTION

According to this invention, there are provided solvent-soluble linear copolyesters which comprise the reaction product of substantially equimolar equivalents of dicarboxylic acids and at least one dihydric alhochol. The dicarboxylic acid equivalents are supplied by a plurality of acid reactants which, based on a total of 100% (molar) acid equivalents, includes at least about 0.1% (molar) equivalents of a sulfonated aromatic compound having a structural formula,

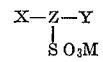

wherein: M is a monovalent cation selected from the group of alkali metals, ammonium, substituted ammonium and quaternary ammonium; X and Y are monovalent radicals which can be the same or different selected from the group of

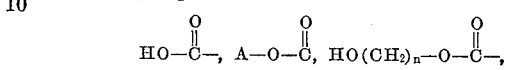

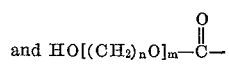

wherein A is a lower alkyl group having 1–5 carbon atoms and $m$ and $n$ are positive integers of less than 20 with $n$ being greater than 1; and Z is a trivalent aromatic radical.

A process for forming aqueous dispersions of the copolyesters of this invention is also provided which comprises:

(1) dissolving the linear copolyester in an organic solvent which is more voltatile than water;
(2) contacting the solution of step (1) with a surfactant and an aqueous medium whereby an aqueous emulsion is formed; and
(3) heating the aqueous emulsion of step (2) to an elevated temperature below the boiling point of water whereby the solvent is evaporated, which leaves the copolyester dispersed in the aqueous medium.

Because the copolyesters of this invention can be dispersed in aqueous mediums, they have many advantages over those of the prior art. Using an aqueous carrier in place of organic solvents greatly reduces the corrosive effects of the polymer system on whatever materials come into contact with the system. It also allows for easy disposition of the aqueous carrier when the polymer is spent without the concomitant disadvantages of toxicity or air and water pollution which usually result from the use of an organic solvent system. A further advantage is that greater quantities of these polymers can be dispersed in an aqueous medium than can be dissolved in an equal amount of most organic solvents due to solubility limitations. Greater concentrations of polymer in the carrier make possible, of course, more economical and efficient use of these polymers. A still further advantage of the linear copolyesters of this invention is that they exhibit improved adhesion when used as coating compositions over the copolyesters of the prior art.

DESCRIPTION OF THE INVENTION

Linear copolyesters are condensation products formed from at least two dicarboxylic acids or their equivalents and approximately equimolar equivalents of one or more dihydric alcohols. To assure linearity, each of the starting materials is difunctional. Difunctional acids and alcohols react with each other to form an essentially straight chain polymer without the formation of appreciable amounts of branch chains.

The copolyesters of this invention are produced by reacting at least two dicarboxylic acids or their equivalents including a sulfonated aromatic compound with at least one dihydric alcohol. The total acid equivalents present should be substantially equal to the total alcohol equivalents on a molar basis. By substantially equal is meant that neither the acid equivalents nor alcohol equivalents which react will exceed a 10% (molar) excess for most purposes.

The copolyesters of this invention are modified by the addition of small amounts of a sulfonated aromatic compound having a structural formula,

The following discussion gives a more detailed description of these sulfonated aromatic compounds in terms of this structural formula.

M in the structural formula represents a monovalent cation which can be: an alkali metal such as sodium, lithium or potassium; or a nitrogen compound having a structural formula,

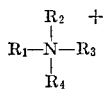

wherein $R_{1-4}$ are individually selected from the group of hydrogen; $C_1$ to $C_{22}$ alkyls; $C_1$ to $C_{22}$ alkyls substituted with one or more $C_1$ to $C_{22}$ alkyls, hydroxy groups, halogens (Cl, F), aryl groups (phenyl, halogenated phenyl, tolyl, xylyl) aryloxy groups (phenoxy, bisphenoxy) alkoxy groups (methoxy, ethoxy, propoxy); phenyl; and phenyl substituted with halogen groups (Cl, F), or $C_1$ to $C_5$ alkyl groups. The nitrogen cation, therefore, can be ammonium, substituted ammonium or a quaternary ammonium. The preferred cations are the alkali metals, particularly sodium and potassium.

X and Y repersent monovalent radicals from the group having the structural formulas:

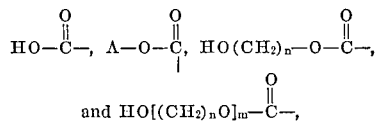

wherein A is a lower alkyl group with less than six carbon atoms and $m$ and $n$ are positive integers with $n$ being greater than one. Usually $m$ and $n$ are less than 20 and preferably are 2-3. X and Y can both be the same radical or they can be different radicals. It is a preferred embodiment when both X and Y have one of the structural formulas

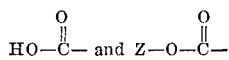

and the particularly preferred embodiment is when both X and Y have the structural formula

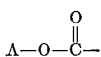

where A is methyl or ethyl.

Z represents a trivalent aromatic radical. Aromatic radicals having from one to four aromatic ring structures such as the trivalent radicals of benzene, naphthalene, anthracene, phenanthrene, phenanthrene-quinone, phenanthridine, phenanthridone, fluorene, bis-fluorene, etc. and their substituted derivatives are particularly useful for this invention. The preferred trivalent aromatic radicals are single ring compounds and the trivalent benzene radical is especially preferred.

Some specific examples of sulfonated aromatic compounds suitable for producing the modified copolyesters of this invention include: sodium - 5 - sulfoisophthalic acid; sodium dimethyl - 5 - sulfoisophthalate; potassium dimethyl - 5 - sulfoisophthalate; potassium diethyl - 5 - sulfoisophthalate; lithium dimethyl - 5 - sulfoisophthalate; ammonium dimethyl - 5 - sulfoisophthalate; tetramethyl ammonium dimethyl - 5 - sulfoisophthalate; potassium bis(hydroxyethyl - 5 - sulfoisophthalate; sodium bis(hydroxyethoxyethyl)-5-sulfoisophthalate; sodium bis-(hydroxytetramethylene)-5-sulfoisophthalate; dodecyl trimethyl ammonium dimethyl - 5 - sulfoisophthalate; stearyl ammonimum dimethyl - 5 - sulfoisophthalate; 12-hydroxy stearyl trimethyl ammonium - 5 - sulfoisophthalic acid; 2 - chloroethyl ammonium 5 - sulfoisophthalic acid; trimethyl phenoxypropyl ammonium dimethyl - 5 - sulfoisophthalate; dimethyl ethoxy polypropoxypropanol ammonium 5 - sulfoisophthalic acid; monochlorophenyl trimethyl ammonium 5 - sulfoisophthalic acid; benzyl trimethyl ammonium 5 - sulfoisophthalic acid; cresol trimethyl ammonium dimethyl - 5 - sulfoisophthalate; 1,2-bis[2 - sulfo - 9 - (2 - carboxyethyl)fluoren - 9 - yl]ethane; 1,2 - bis[2 - potassiumsulfo - 9 - (2 - carboxyethyl) fluoren - 9 - yl] ethane; 1,2 - bis[2 - sodiumsulfo - 9 - (2-carboxyethyl)fluoren - 9 - yl] ethane; 1,4 - bis[2 - sufo-9 - (2 - carboxyethyl)fluoren - 9 - yl]butane; 1,4 - bis[2-lithiumsulfo - 9 - (2-carboxyethyl)fluoren - 9 - yl] butane; 1,6 - bis[2 - sulfo - 9 - (2 - carboxyethyl)fluoren - 9 - yl]-hexane; 2 - ethyl - 1,6 - bis[2 - potassiumsulfo - 9 - (2-carboxyethyl)fluoren - 9 - yl]hexane; 1,10 - bis]2 - sulfo-9 - (2 - carboxyethyl)fluoren - 9 - yl]decane; 1,10 - bis-[2 - sodium sulfo - 9 - (2 - carboxyethyl)fluoren - 9 - yl] decane; 1,2 - bis[2 - sulfo - 9 - (2 - carbomethoxyethyl)-fluoren - 9 - yl] ethane; 1,2 - bis[2 - potassiumsulfo - 9 - (2 - carbomethoxyethyl)fluoren - 9 - yl]ethane; 1,2 - bis-[2 - sodiumsulfo - 9 - (2 - carbomethoxyethyl)fluoren - 9 - yl]ethane; 1,4 - bis[2 - sulfo - 9 - (2 - carbomethoxyethyl)fluoren - 9 - yl] - butane; 1,4 - bis[2 - lithiumsulfo-9 - (2 - carbomethoxyethyl)fluoren - 9 - yl]butane; 1,6-bis[2 - sulfo - 9 - (2 - carbomethoxyethyl)fluoren - 9 - yl] hexane; 2 - ethyl - 1,6 - bis[2 - potassiumsulfo - 9 - (2 - sulfo - 9 - (2 - carbomethoxyethyl)fluoren - 9 - yl]hexane; 1,10 - bis]2 - carbomethoxyethyl)fluoren - 9 - yl]decane; 1,10-bis[2-potassiumsulfo - 9 - (2 - carbomethoxyethyl) fluoren - 9 - yl]decane; 1,2-bis[2-sodiumsulfo-9-(2-carbobutoxyethyl)fluoren - 9 - yl]ethane; 1,2-bis[2-sulfo-9-(2-carbooctoxyethyl)fluoren - 9 - yl]ethane; 1,2 - bis[2 - potassium sulfo - 9 - (2-carbooctoxyethyl)fluoren - 9 - yl]ethane; and the like.

A detailed description of many of these sulfonated aromatic compounds and their preparation can be found in the following patents, herein incorporated by reference for the purpose of such description: Griffing et al., U.S. 3,018,272, issued Jan. 23, 1962; and Horn et al., U.S. 3,324,084, issued June 6, 1967.

As can readily be seen by persons skilled in the art, these sulfonated aromatic compounds are dicarboxylic acids or molar equivalents of dicarboxylic acids. They are one of a plurality of reactants which add up to a total of 100% molar acid equivalents. The term acid equivalent is used to include dicarboxylic acids and compounds which will produce the same number of reactive carboxyl groups as those compounds' corresponding dicarboxylic acids will produce in a condensation reaction. For example, one mole of dimethyl terephthalate and one mole of terephthalic acid will each produce two reactive carboxylic acid groups in a condensation reaction; therefore, dimethyl terephthalate is an acid equivalent of terephthalic acid. Similarly, adipoyl chloride is an acid equivalent of adipic acid and phthalic anhydride is an acid equivalent of o-phthalic acid. Also, sodium dimethyl - 5 - sulfoisophthalate is an acid equivalent of sodium 5 - sulfoisophthalic acid. In a like manner, alcohol equivalent refers to dihydric alcohols and compounds which will produce the same number of reactive hydroxy groups as those compounds' corresponding dihydric alcohols such as bis-phenols and dihydroxy benzenes.

An improvement in the aqueous dispersibility of linear copolyesters is achieved with the addition of very small quantities of the sulfonated aromatic compounds of this invention. Amounts as low as about 0.1 molar percent, based on the total acid equivalents present, will produce a significant improvement. Increasing amounts can be used up to about ten molar percent, at which point the viscosity of the polymerization melt is increased to an undesirable high level making the melt unworkable with conventional equipment. Amounts between about 0.5 and about 2.5 molar percent are preferred because within these limits, a copolyester having excellent aqueous dispersibility is obtained without adversely affecting other desirable characteristics of the polymers, such as viscosity and solubility.

The dicarboxylic acid equivalents for the copolyesters of this invention can be supplied by one or more dicarboxylic acids or their equivalents in addition to the sulfonated aromatic compound. These acids can be combined in various combinations to provide copolyesters with a wide variety of properties. Some of the physical properties which can be changed by varying the acid systems include the degree of crystallinity, toughness, solubility, elasticity, softening point, adhesiveness, and durability of the copolyester products. Examples of reactants suitable for supplying the dicarboxylic acid equivalents include aromatic acids such as terephthalic acid, orthophthalic acid, homoterephthalic acid, hydrogenated terepththalic acid, isophthalic acid and such saturated aliphatic acids as malonic, succinic, glutaric, adipic, pimelic, suberic, azelaic and sebacic. Of course, compounds which are acid equivalents of the above-mentioned dicarboxylic acids can also be used as reactants in this invention. Halogenated aromatic dicarboxylic acids or their equivalents such as chlorendic anhydride, tetrabromophthalic anhydride, and tetrachlorophthalic anhydride, can also be used as reactants to provide product copolyesters having fire preventative properties.

Excellent chemical and physical properties can be obtained in the copolyesters of this invention, if at least about 5% molar of terephthalic acid or terephthalic acid equivalents, based on the total acid equivalents, are used as reactants. Higher amonts are often used.

Terephthalic acid equivalents can be provided by many compounds for the copolyesters of this invention. Some of these include dimethyl terephthalate, diethyl terephthalate and many other corresponding esters, halides or salts. It is also possible and sometimes desirable to use reclaimed terephthalate ester products, such as those disclosed in MacDowell, U.S. Pat. 3,222,299, issued Dec. 7, 1965.

Although the unique characteristics of the copolyesters of this invention are achieved by adding small amounts of the difunctional acid derivatives of sulfonated aromatic compound, small amounts of monofunctional acid derivatives can also be added to achieve special results. As is well known in the art, for example, small amounts of the monofunctional acid derivatives with or without sulfonic acid groups can be used to control the molecular weights of the product polymers.

In forming the copolyesters of this invention, it is also possible to add to the dicarboxylic acid reactants an amount of one or more diisocyanates such as 2,6-toluene diisocyanate or metaphenylene diisocyanate. Such techniques are well known in the art.

The third reactant necessary to form the copolyesters of this invention is a dihydric alcohol or diol. Suitable diols include aliphatic diols containing from 2 to 10 carbon atoms, cycloaliphatic diols, aromatic diols, and heterocyclic diols. Specific examples of suitable dihydric alcohols include ethylene glycol, diethylene glycol, 1,4-butanediol, 1,5-pentanediol, 1,4-butene-2-diol, 1,2-propanediol, 1,3-propanediol, 1,6-hexanediol, 1,3-cyclo-butanediol, 1,4-cyclohexanediol, 1,4-cyclohexane dimethanol, 2,2-dimethyl propanediol-1,3, hydrogenated bisdiphenol dimethyl methane, epoxylated tetrachlorohydroquinone and chlorinated bisphenol. The preferred dihydric alcohols are those straight chain diols having 2 to 5 carbon atoms and two primary hydroxyl groups. Ethylene glycol is especially preferred because it results in copolyesters with good crystallinity, good chemical resistance and many other desirable characteristics. Of course, mixtures of two or more diols can also be used.

As is well known, the formation of an ester from an alcohol and an acid is a condensation reaction whose stoichiometry is 1/1 on a molar basis. Therefore, it is necessary to have an amount of dihydric alcohol equivalents present which is substantially equal to the total of the dicarboxylic acid equivalents present. As a practical matter, an excess of up to about ten molar percent of the dihydric alcohol is usually present in the reaction product. Excess alcohol, which may be present in the reaction mixture in an amount of about 100 to 200%, is removed during esterification and polymerization by distillation.

The linear copolyesters of this invention are prepared by any of the standard copolyesterification techniques which are well known in the art. One suitable technique is the simple melt polymerization of the reactants at elevated temperatures in the presence of catalyst. Various other reactants, additives, catalysts and processes of manufacture, in addition to those specifically enumerated above, are suitable for forming the copolyesters of this invention, and the following patents, all of which are herein incorporated by reference, are illustrative of some of these: Synder, U.S. 2,623,031, issued Dec. 23, 1952 and U.S. 2,623,033, issued Dec. 23, 1952; Quisenberry, U.S. 3,265,-762, issued Aug. 9, 1966; Dye, U.S. 2,892,747, issued June 30, 1959; Milone et al., U.S. 2,965,613, issued Dec. 20, 1960; Willard, U.S. 3,013,914, issued Dec. 19, 1961; Hornbaker, U.S. 3,227,682, issued Jan. 4, 1966; and Horn et al., U.S. 3,324,084, issued June 6, 1967. Copolyesters suitable for use with this invention and techniques for their preparation are also thoroughly described in: (1) Polyesters, by V. V. Korshak and S. V. Vinogradova, translated from Russian by B. J. Hazzard, Pergamon Press, New York (1965) at pages 72 to 251; and (2) The Chemistry of Synthetic Resins, vol. 1, by Carleton Ellis, Reinhold Publishing Co., New York (1935) at chapter 42, pages 883–893.

As has been stated, the linear copolyesters of this invention can be dispersed in an aqueous medium. The term aqueous medium is used to include pure water and water combined with other ingredients which do not substantially change the important physical and chemical properties exhibited by water. Some of the physical and chemical characteristics of water which are considered important for use with these copolyesters are its chemical inertness, lack of odor, low corrosiveness, lack of toxicity, nonflammability, controllable application viscosity, and its low cost.

One process for producing the linear copolyester dispersions of this invention is by post emulsification. Post emulsification is accomplished by dissolving the solid copolyesters in an organic solvent, adding water and a surfactant to the solution to form an emulsion, and then evaporating the organic solvent. Suitable surfactants include anionic and nonionic surfactants such as sodium oleate, sodium sulfonated lauryl alcohol, sodium alkyl aryl polyether sulfate, sodium alkyl aryl polyether sulfonate and alkyl aryl polyether alcohol. Combinations of anionic, nonionic or both also can be used.

The organic solvent used in the post emulsification process must be more volatile than water. Normally the evaporation is carried out under reduced pressure. Dispersed copolyester particle size can be controlled by using a mixture of organic solvents, one of which is water miscible; the other being water immiscible. In general, as the water miscible solvent portion is increased, the product copolyester particle size is decreased. Some examples of suitable water miscible organic solvents include acetone, methyl ethyl ketone, ethyl acetate, methanol, ethanol, propanol, and dioxane. Examples of suitable water immiscible organic solvents include toluene, benzene, aliphatic hydrocarbons such as carbon tetrachloride, nitromethane and methylene chloride. When a mixture is used, it is generally preferable to select the solvents so that the water miscible component is more volatile than the water immiscible and both are more volatile than water. Of course, one of the two must be a solvent for the copolyester. For a more detailed discussion of post emulsification techniques, see Halper et al., U.S. Pat. 3,277,037, issued Oct. 4, 1966, herein expressly incorporated by reference.

The linear copolyesters of this invention are used in making coating compositions by techniques which are conventional in the art. Their relative viscosity ranges between about 1.3 and about 1.7 measured as a 0.58% solution of m-cresol at 25° C. Copolyesters having lower relative viscosities are not cohesive enough to form useful coatings, and those with higher relative viscosities are insoluble in practical solvents. The term relative viscosity is used to mean the viscosity of the polymer solution compared to that of the pure solvent, both being measured at 25° C.

The copolyesters of this invention are solvent-soluble. The term solvent-soluble is used to mean that the copolyesters will dissolve in practical volatile organic solvents at room temperature in an amount of at least about 1% by weight, and preferably in an amount of about 5% to about 15% or more by weight based on the total weight of solution. Volatile organic solvents are considered practical if they will vaporize in a reasonable amount of time at ambient air temperatures or low oven temperatures commonly used in the coatings and adhesives industry. Acetone, methyl ethyl ketone, ethyl acetate, ethanol, propanol, dioxane, toluene, benzene, aliphatic hydrocarbons, dimethyl formamide, methylene chloride, 1,1-dichloroethane, carbon tetrachloride, etc., are considered to be practical volatile organic solvents for purposes of this invention.

A preferred embodiment of this invention comprises a copolyester formed from ethylene glycol and either (a) terephthalic acid and sebacic acid equivalents, or (b) terephthalic, isophthalic and sebacic acid equivalents and about 0.5 to about 2.5 molar percent of sodium dimethyl-5-sulfoisophthalate based on the total acid equivalents present. An especially preferred copolyester is formed when the dicarboxylic acid equivalents comprise about 50–60% (molar) terephthalic acid equivalents; about 40–50% (molar) sebacic acid equivalents; and about 0.5–2.5% (molar) equivalents of sodium-5-sulfoisophthalic acid. It is particularly preferred when the dicarboxylic acid equivalents are supplied by the following equivalents of: about 54% (molar) terephthalic acid; about 45% (molar) sebacic acid; and about 1% (molar) sodium dimethyl-5-sulfoisophthalate. Another especially preferred embodiment is when the dicarboxylic acid equivalents are supplied by equivalents of the following acids: about 25–35% (molar) terephthalic acid; about 45–55% (molar) sebacic acid; about 15–20% (molar) isophthalic acid; and about 0.5–2.5% (molar) sodium 5-sulfoisophthalic acid. This embodiment is particularly preferred when the acid equivalents are present in the following amounts: about 32% (molar) terephthalic; about 50% (molar) sebacic; about 17% (molar) isophthalic; and about 1% (molar) sodium dimethyl-5-sulfoisophthalate. These linear copolyesters form excellent coating compositions either in solvents or aqueous mediums. Coatings formed from aqueous dispersions have improved adhesion with the virtual elimination of air and water pollution, toxic effects and corrosiveness due to the vehicle. At such low levels of the sulfonated isophthalic acid, the excellent physical and chemical properties of the terephthalate copolyesters are not adversely affected.

Aqueous dispersion of the linear copolyester of the invention are, in general, useful in the same applications as solvent-borne linear copolyesters. More specifically, these dispersions are useful for forming coating compositions which are excellent adhesives and can be used in forming laminates. These adhesives are particularly useful in forming laminates by bonding "Mylar" polyethylene terephthalate film or equivalent polyester film to: aluminum foil, ceramics, cloth, enamels, "Mylar" polyethylene terephthalate film, paper, steel, vinyl films, wood, etc. "Mylar" is a register trademark of the E. I. du Pont de Nemours Chemical Co. for films or linear polyethylene terephthalate. Such laminates have many uses including uses as acoustical tile, bag liners, counter top materials, decorative metallic laminations, heat sealing tape, metallic yarns, motion picture screens, radiant heating panels, solar energy equipment, spiral wound tubing, wall covering materials, etc.

The following examples illustrate the invention. Unless otherwise specified, all parts and percentages are by weight.

Example 1

The following reactants are added to a reaction vessel fitted with a nitrogen inlet, thermometer, stirrer and Dean-Stark trap for removing distillates during the reaction:

196 parts of dimethyl terephthalate
200 parts of dimethyl sebacate
4 parts of sodium dimethyl-5-sulfoisophthalate.

The reactants are added to 300 parts of ethylene glycol and heated to 170° C. The mixture is maintained with stirring at atmospheric pressure under a nitrogen blanket in the presence of 0.04 part each of litharge and zinc borate until the ester interchange reaction is completed, as indicated by the cessation of ebullition of methanol. The temperature rises during the ester interchange operation so that a temperature in the region of 225° C. is reached. Heating is then continued and an excess glycol is driven off, the system is gradually placed under vacuum and the temperature is raised to the vicinity of 275° C. The pressure on the system is reduced to 0.5 millimeter of mercury and the melt condensation continues with the evolution of glycol for a period of 5 hours while the reaction mixture is stirred vigorously. The terephthalate copolyester product has a relative viscosity of 1.58 measured as a 0.58% solution in m-cresol at 25° C. and has a melting point range of 135 to 145° C. The modified copolyester has an adhesion of 10 pounds/linear inch measured as a bond formed between two pieces of "Mylar" linear polyethylene terephthalate film. Such a bond is formed by coating a 20% solution of the terephthalate copolyester product onto one surface of "Mylar" linear polyethylene terephthalate film and then flashing the solvent off by placing the coated "Mylar" in an oven at an elevated temperature. The coated film is then joined to a non-coated piece of film in a laminating press with a #10 rod applying a pressure of 20,000 p.s.i. and a temperature of 325° F. for 20 seconds.

Coarse woven cotton fabric can be superimposed with a fine "Dacron" fabric to give a strengthened composite by using the copolyester product of this example as an adhesive layer as described above for the film composites. "Dacron" is a registered trademark of the E. I. du Pont de Nemours & Company for polyester fiber.

The product copolyester in a 20% solution can also be sprayed onto a non-woven web and dried in an oven at 325° F. with mild pressure to form a coated non-woven fabric.

A copolyester produced without the sodium dimethyl-5-sulfoisophthalate has a relative viscosity of 1.61, a melting point range of 140–150° C., and an adhesion measured as a "Mylar" to "Mylar" bond of 6 pounds per linear inch.

Examples 2–7

The procedure of Example 1 can be followed to obtain similar results with the amounts of ingredients set out in Table I substituted for the dicarboxylic acid and dihydric alcohol equivalents specified in Example 1.

TABLE I

| Example | Dicarboxylic acid equivalents | Dihydric alcohol equivalents |
|---|---|---|
| 2 | 192 parts dimethyl terephthalate<br>8 parts sodium dimethyl-5-sulfoisophthalate | 300 parts ethylene glycol. |
| 3 | 160 parts processed polyethylene terephthalate<br>40 parts sodium dimethyl-5-sulfoisophthalate<br>172 parts azelaic acid | Do. |
| 4 | 168 parts terephthalic acid<br>4 parts potassium dimethyl-5-sulfoisophthalate | 450 parts 1,4-butanediol. |
| 5 | 164 parts terephthalic acid<br>4 parts ammonium dimethyl-5-sulfoisophthalate. | Do. |
| 6 | 168 parts sebacic acid<br>29.6 parts sodium dimethyl-5-sulfoisophthalate. | 300 parts ethylene glycol. |
| 7 | 155 parts dimethyl terephthalate<br>8.95 parts 1,2-bis[fluoren-9-yl] ethane | 160 parts ethylene glycol. |

Example 8

The following reactants are used:

1 part sodium dimethyl-5-sulfoisophthalic acid;
37 parts diethyl terephthalate;
38 parts diethyl isophthalate;
13.2 parts of a solution comprising 66.8 parts of diethyl adipate in 33.2 parts ethylene glycol;
10.8 parts of diethyl sebacate; and
0.5 part of antimony oxide.

A melt polymerization is carried out by heating the above reactants at atmospheric pressure with gentle stirring under a nitrogen blanket for 30 minutes at a temperature in the range of 220° C. to 250° C. Thereafter the pressure is reduced to about 0.5–1.5 mm. Hg and heating is continued increasing the temperature to about 280° C. over a period of several hours, while excess glycol is removed by distillation. The polymerization is conducted until the copolyester has a relative viscosity of from 1.3 to 1.7 on the basis of 0.6 g. in 100 cc. of metacresol at 25° C. At this degree of polymerization, the melting point of the copolyester is about 120° C.

The molar proportions of dicarboxylic acid components are about:

| | Mol percent |
|---|---|
| Terephthalic acid | 39 |
| Isophthalic acid | 40 |
| Adipic acid | 10 |
| Sebacic acid | 10 |
| Sodium-5-sulfoisophthalic acid | 1 |
| Total | 100 |

The copolyester is soluble in dioxane, tetrahydrofurane, methylene chloride, chloroform, a mixture of equal parts of toluene and dioxane, and a mixture of 1 part dioxane and 3 parts methyl ethyl ketone. At 20% by weight of copolyester in these organic solvents, the solutions are of low viscosity, ordinarily less than 150 cps. at 25° C. Where the use of solvent is undesirable, the terephthalate copolyester can be converted to an aqueous dispersion by post emulsification techniques.

Example 9

The procedure of Example 8 can be followed except that 0.5 part of sodium bis(hydroxytetramethylene)5-sulfoisophthalate is substituted for the sodium dimethyl-5-sulfoisophthalate and 37.5 parts of diethyl terephthalate is used. The results are similar to those of Example 8.

Example 10

An aqueous dispersion of the product copolyester of Example 8 is prepared by post emulsification techniques as described below.

The following premixed solvent and water phases are emulsified at room temperature in a Waring Blendor:

Premix solvent phase:
 21.5 parts copolyester product of Example 8,
 45.5 parts methyl ethyl ketone,
 45.5 parts toluene.
Premix water phase:
 125 parts deionized water,
 2.5 parts "Triton" 770.

"Triton" 770 is a registered trademark of the Rohm and Haas Co. for a wetting agent of a sodium alkyl aryl polyether sulfate.

The cold emulsion is then transferred to a Rinco vacuum evaporator where the organic solvent is stripped and the resulting dispersion is concentrated to 50% solids. This dispersion is a low viscosity fluid consisting of spherical particles varying from about 0.5 to 50 microns in diameter. A bond formed between two pieces of "Mylar" linear polyethylene terephthalate film from the indicated copolyesters of this example has the following adhesive strength:

| | Lbs. |
|---|---|
| Organic solvent solution | 8.1 |
| 50% aqueous dispersion | 4.2 |
| Control (same copolyester except no sulfonated aromatic compound present) | 1.7 |

All attempted efforts to disperse the control copolyester failed.

Example 11

The copolyester product of Example 1 can be dispersed in an aqueous medium following the procedure of Example 10. Similar results are obtained.

Example 12

The copolyester product of Example 2 can be dispersed in an aqueous medium following the procedure of Example 10. Similar results are obtained.

What is claimed is:

1. An aqueous dispersion of a solvent-soluble linear copolyester having a relative viscosity of from about 1.3 to about 1.7 which comprises the reaction product of substantially equimolar equivalents of at least two dicarboxylic acids and at least one dihydric alcohol, said dicarboxylic acid equivalents being supplied by a plurality of acid reactants which, based on a total of 100% (molar) acid equivalents, includes from about 0.1% (molar) to about 10% (molar) equivalents of an aromatic sulfonated compound having a structural formula,

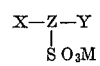

wherein:
 M is a monovalent cation selected from the group of an alkali metal, ammonium, substituted ammonium, and quaternary ammonium;

X and Y are monovalent radicals individually selected from the group having structural formulas consisting of

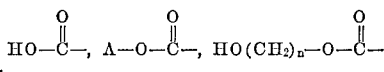

and

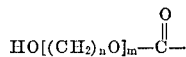

wherein A is a lower alkyl group having 1–5 carbon atoms, and $m$ and $n$ are positive integers of less than 20 with $n$ being greater than 1; and Z is a trivalent aromatic radical.

2. The aqueous dispersion of claim 1 wherein the sulfonated aromatic compound is sodium dimethyl-5-sulfoisophthalate which is present in an amount of about 0.5% to about 2.5% (molar) based on a total of 100% molar acid equivalents.

3. The aqueous dispersion of claim 2 wherein at least about 5% (molar) of the acid equivalents comprise equivalents of a saturated aliphatic acid selected from the group consisting of malonic, succinic, glutaric, adipic, pimelic, suberic, azelaic, sebacic, and combinations of these; and at least about 5% (molar) of the acid equivalents comprise equivalents of an aromatic acid selected from the group of terephthalic acid, orthophthalic acid, isophthalic acid, homoterephthalic acid, hydrogenated terephthalic acid, and combinations of these.

4. The aqueous dispersion of claim 3 wherein the aromatic acid equivalents are supplied by a combination of isophthalic acid equivalents and terephthalic acid equivalents and wherein the saturated aliphatic acid equivalents are azelaic acid equivalents.

5. The aqueous dispersion of claim 4 wherein the saturated aliphatic acid equilavents are sebacic acid equivalents.

6. The aqueous dispersion of claim 1 wherein the dicarboxylic acid equivalents comprise:

(a) from about 50% to about 60% (molar) terephthalic acid equivalents;

(b) from about 40% to about 50% (molar) sebacic acid equivalents; and (c) from about 0.5% to about 2.5% (molar) equivalents of sodium 5-sulfoisophthalic acid, the sum of said dicarboxylic acid equivalents being equal to 100% (molar).

7. The aqueous dispersion of claim 1 wherein the dicarboxylic acid equivalents comprise:

(a) from about 25% to about 35% (molar) terephthalic acid equivalents;

(b) from about 45% to about 55% (molar) sebacic acid equivalents;

(c) from about 15% to about 20% (molar) isophthalic acid equivalents; and (d) from about 0.5% to about 2.5% (molar) equivalents of sodium 5-sulfoisophthalic acid, the sum of said dicarboxylic acid equivalents being equal to 100% (molar).

8. A process for forming the aqueous dispersion of claim 1 which comprises:

(a) dissolving the linear copolyester in an organic solvent, said organic solvent being more volatile than water;

(b) contacting the solution with a surfactant and an aqueous medium whereby an aqueous emulsion is formed; and (c) vaporizing the solvent which leaves the copolyester dispersed in the aqueous medium.

9. The process of claim 8 wherein the surfactant is an anionic surfactant.

10. The process of claim 8 wherein the surfactant is a nonionic surfactant.

11. The process of claim 9 wherein the organic solvent is selected from the group consisting of acetone, methyl ethyl ketone, ethyl acetate, methanol, ethanol, propanol, dioxane, toluene, benzene, carbon tetrachloride, nitromethane, methylene chloride and combinations of these.

References Cited

UNITED STATES PATENTS

| | | | |
|---|---|---|---|
| 3,277,037 | 10/1966 | Halper et al. | 260—29.2UX |
| 2,214,405 | 10/1940 | Coffman | 260—29.2 |
| 3,074,818 | 1/1963 | Lee | 260—29.2X |
| 3,115,476 | 12/1963 | Agens | 260—29.2X |
| 3,184,436 | 5/1965 | Mayat | 260—29.2X |
| 3,185,671 | 5/1965 | Horn | 260—75S |
| 3,212,920 | 10/1965 | Chapman | 260—29.2X |
| 3,222,305 | 12/1965 | MacDowell | 260—75S |
| 3,313,778 | 4/1967 | Sakurai et al. | 260—75S |
| 3,314,920 | 4/1967 | Sakurai et al. | 260—75S |
| 3,317,632 | 5/1967 | Quisenberg | 260—75S |
| 3,324,084 | 6/1967 | Horn | 260—75S |
| 3,331,801 | 7/1967 | Osmond et al. | 260—31.2 |

JAY H. WOO, Primary Examiner

U.S. Cl. X.R.

260—75; 156—332; 161—214, 232